US009705777B2

(12) United States Patent
Giannakopoulos et al.

(10) Patent No.: US 9,705,777 B2
(45) Date of Patent: Jul. 11, 2017

(54) SYSTEM AND METHOD FOR MONITORING ENCODED SIGNALS IN A NETWORK

(71) Applicants: Dimitrios Giannakopoulos, Andover, MA (US); Ben Brown, Chichester, NH (US)

(72) Inventors: Dimitrios Giannakopoulos, Andover, MA (US); Ben Brown, Chichester, NH (US)

(73) Assignee: MACOM CONNECTIVITY SOLUTIONS, LLC, Lowell, MA (US)

( * ) Notice: Subject to any disclaimer, the term of this patent is extended or adjusted under 35 U.S.C. 154(b) by 62 days.

(21) Appl. No.: 13/762,589

(22) Filed: Feb. 8, 2013

(65) Prior Publication Data

US 2016/0020978 A1    Jan. 21, 2016

(51) Int. Cl.
*H04L 12/26* (2006.01)

(52) U.S. Cl.
CPC .......... *H04L 43/12* (2013.01); *H04L 43/0847* (2013.01)

(58) Field of Classification Search
None
See application file for complete search history.

(56) References Cited

U.S. PATENT DOCUMENTS

| 7,106,862 B1* | 9/2006 | Blair | H04J 3/1652 |
| | | | 380/256 |
| 2002/0018444 A1* | 2/2002 | Cremin | H04J 3/0629 |
| | | | 370/235 |
| 2010/0208753 A1* | 8/2010 | Brown | H04L 29/06 |
| | | | 370/476 |
| 2012/0044951 A1* | 2/2012 | Han | H04L 69/323 |
| | | | 370/419 |
| 2013/0083810 A1* | 4/2013 | Ghiasi | H04J 3/047 |
| | | | 370/535 |
| 2014/0189459 A1* | 7/2014 | Vijayaraghavan | H03M 13/353 |
| | | | 714/755 |

* cited by examiner

*Primary Examiner* — Yemane Mesfin
*Assistant Examiner* — Peter Chen
(74) *Attorney, Agent, or Firm* — Amin, Turocy & Watson LLP

(57) ABSTRACT

Various aspects provide for non-intrusively monitoring a network system. A multiplexing component is configured to receive a plurality of first encoded signals and generate a plurality of second encoded signals. The plurality of second encoded signals contain a different data rate and a different number of network lanes than the plurality of first encoded signals. A monitoring component is configured to identify a block location for repeating blocks and an alignment marker in each of the plurality of first encoded signals and/or the plurality of second encoded signals. The monitoring component can also be configured to identify one or more defects, identify error information and/or determine one or more skew values associated with the plurality of first encoded signals and/or the plurality of second encoded signals.

20 Claims, 12 Drawing Sheets

SYSTEM AND METHOD FOR MONITORING ENCODED SIGNALS IN A NETWORK

TECHNICAL FIELD

The subject disclosure relates generally to networking, and more particularly to monitoring encoded signals in a network.

BACKGROUND

Electronic communications, whether over a local or wide-area network or among components of a local bus, can involve a variety of programmed actions and/or protocols. For instance, data to be transmitted throughout a network (e.g., from one electronic component to another) is often organized into subgroups of transmitted information. A networking protocol can specify formats and/or rules for the transmission and/or reception of data (e.g., data signals) within a network (e.g., an Ethernet network). For example, a networking protocol can provide various formats and/or rules for routing data signals in a network (e.g., routing data signals between hubs, switches and/or routers).

Often times, numerous devices in a network are configured to retime, multiplex and/or de-multiplex data signals (e.g., incoming network traffic). For example, a physical medium attachment (PMA) device can receive ten 10 gigabit per second (Gbps) signals and can output four 25 Gbps signals to allow more efficient transport of the data signal throughout the network. However, current networking systems are often difficult to troubleshoot. For example, the original order of encoded signals included in a data signal often times is not preserved throughout a network. As such, it is often difficult to identify each encoded signal in a data signal and/or within a network. Furthermore, it is often difficult to determine quality of each encoded signal in a data signal and/or within a network.

The above-described description is merely intended to provide a contextual overview of current network systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a multiplexing component and a monitoring component. The multiplexing component is configured to receive a plurality of first encoded signals and generate a plurality of second encoded signals. The plurality of second encoded signals comprise a different data rate and a different number of network lanes than the plurality of first encoded signals. The monitoring component is configured to identify a block location for repeating blocks and an alignment marker in each of the plurality of second encoded signals. In one example, the monitoring component is configured to determine a bit error rate (BER) quality value for each of the one or more second encoded signals. In another example, the monitoring component is configured to determine one or more defects associated with the one or more second encoded signals. In yet another example, the monitoring component is configured to determine one or more skew values associated with the one or more second encoded signals.

In another example embodiment, a method comprises receiving a plurality of first encoded signals. The method also includes generating a plurality of second encoded signals, wherein the plurality of second encoded signals comprise a different data rate and a different number of network lanes than the plurality of first encoded signals. The method further includes identifying a block location and an alignment marker for repeating blocks in each of the plurality of second encoded signals. The method can also include generating monitoring data comprising at least the alignment marker for each of the plurality of second encoded signals.

In yet another example embodiment, a system includes a means for receiving one or more first encoded signals. The system also includes a means for generating one or more second encoded signals, wherein the one or more second encoded signals comprise a different data rate and a different number of network lanes than the one or more first encoded signals. The system further includes a means for identifying a block location for repeating blocks and an alignment marker in each of the one or more second encoded signals. The system can also include a means for generating monitoring data comprising at least the alignment marker, defect information and skew information for each of the one or more second encoded signals.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
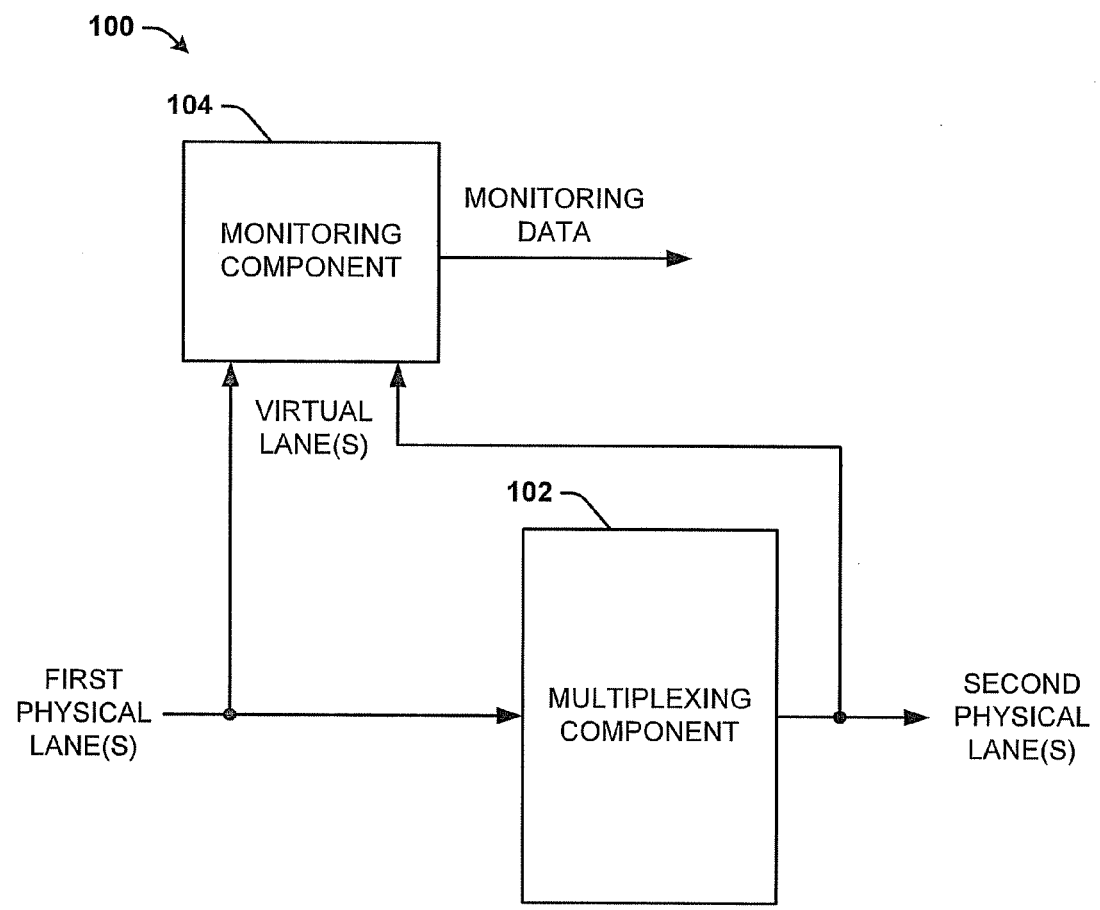
FIG. 1 is a block diagram illustrating an example, non-limiting embodiment of a network monitoring system in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

Various aspects of the present disclosure provide a system for monitoring encoded signals in a network. For example, the encoded signals can be implemented as multi-lane distribution (MLD) signals. The system permits network elements carrying MLD traffic (e.g., 40 Gigabit Ethernet (GbE) traffic, 100 GbE traffic, multi-lane gearbox (MLG) traffic, etc.) to be monitored non-intrusively (e.g., without altering and/or de-skewing the encoded signals). As such, a logical to physical lane location (e.g., virtual to physical lane mapping) for each encoded signal in the network can be identified (e.g., interleaving order of the encoded signals can be determined). Furthermore, bit error rate (BER) quality of each encoded signal in the network can be determined. As such, lower quality physical links (e.g., lower quality physical connections that transmit the encoded signals) can be more easily identified in the network (e.g., during network troubleshooting, network debugging, network analysis, etc.). Additionally, defect(s) related to each of the encoded signals can be identified. In addition, relative skew between encoded signals can be measured. Therefore, network routes with large skew can be identified. The monitoring techniques presented herein can be applied to live traffic (e.g., live network traffic) and/or test signals (e.g., virtual lane(s) carrying pseudo-random binary sequence (PRBS) payload traffic).

Turning now to FIG. 1, a block diagram illustrating an example, non-limiting embodiment of a network monitoring system in accordance with various aspects described herein is shown. System 100 includes a multiplexing component (multiplexer, de-multiplexer, gearbox) 102 and a monitoring component 104. In one example, the system 100 can be implemented in a data communication system and/or a telecommunication system. For example, the system 100 can be implemented in an Ethernet network system and/or an optical transport network (OTN) system. However, it is to be appreciated that the system 100 can be implemented as a different type of network system. The system 100 can accept data rates (e.g., serial data rates) of 40 Gbps and/or 100 Gbps (e.g., with virtual lane interleaving nodes). For example, the system 100 can implement a MLD protocol. However, it is to be appreciated that the system 100 can be implemented for a different type of network protocol and/or for different signal rates. The system 100 can be implemented on a system interface, a client interface, a host interface and/or a line interface. In one example, the system 100 can be implemented on a transmitter and/or a receiver (e.g., a transceiver) interface device.

The multiplexing component 102 can be implemented as a physical medium attachment (PMA) device. For example, the multiplexing component 102 can be implemented as a multiplexer and/or a de-multiplexer. In one example, the multiplexing component 102 can be implemented as an x:m gearbox component (or a m:x gearbox component), where x is an integer value greater than or equal to one and m is an integer greater than or equal to one. The multiplexing component 102 can receive one or more physical lanes (e.g., FIRST PHYSICAL LANE(S) shown in FIG. 1). The one or more physical lanes can be implemented as one or more physical connections (e.g., one or more physical lanes). For example, the one or more physical lanes can be implemented as copper cable, optical fiber and/or wireless transmission medium.

Each of the one or more physical lanes (e.g., one or more input lanes) can include one or more encoded signals (e.g., one or more virtual lanes, one or more virtual lane bitstreams, one or more logical lanes). As such, the multiplexing component 102 can be configured to receive a plurality of first encoded signals. In one example, the plurality of first encoded signals can be implemented as physical coding sub-layer (PCS) lanes. In another example, the plurality of first encoded signals can be implemented as multi-lane gearbox (MLG) lanes. In one embodiment, the plurality of first encoded signals can be generated by a processor (not shown). For example, the plurality of first encoded signals can be generated by a network processing unit (NPU). In another embodiment, the plurality of first encoded signals can be generated by a media access control (MAC) device (not shown). Each of the plurality of first encoded signals can be a serial stream of formatted blocks. For example, each of the plurality of first encoded signals can be a serial stream of 64B/66B formatted blocks (e.g., a 64B/66B encoded signal). Furthermore, each of the plurality of first encoded signals can include one or more bits (e.g., two bits) for boundary identification, one or more header bits and/or one or more bits (e.g., 64 bits) containing scrambled information.

The multiplexing component 102 can be implemented to alter a lane number and/or a data rate for each of the one or more physical lanes (e.g., plurality of first encoded signals). For example, the multiplexing component 102 can be configured to generate one or more other physical lanes (e.g., SECOND PHYSICAL LANE(S) shown in FIG. 1). The one or more other physical lanes can be implemented as one or more physical connections (e.g., one or more physical lanes). For example, the one or more other physical lanes can be implemented as copper cable, optical fiber and/or wireless transmission medium. The number of other physical lanes (e.g., SECOND PHYSICAL LANE(S)) can be different that the number of physical lanes (e.g., FIRST PHYSICAL LANE(S)). Furthermore, the serial data rate of the other physical lanes (e.g., SECOND PHYSICAL LANE(S)) can be different than the serial data rate of the physical lanes (e.g., FIRST PHYSICAL LANE(S)). For example, the multiplexing component 102 can receive ten physical lanes at 10 Gbps and can generate four physical lanes at 25 Gbps.

The one or more other physical lanes (e.g., one or more output lanes) can include a plurality of second encoded signals (e.g., a plurality of second virtual lanes). The number of second encoded signals can be different than the number of first encoded signals. Furthermore, the data rate of the second encoded signals can be different than the data rate of the first encoded signals. In one example, the plurality of second encoded signals can be implemented as PCS lanes. In another example, the plurality of second encoded signals can be implemented as MLG lanes. Each of the plurality of second encoded signals can be a serial stream of formatted blocks. For example, each of the plurality of second encoded signals can be a serial stream of 64B/66B formatted blocks (e.g., a 64B/66B encoded signal). Furthermore, each of the plurality of second encoded signals can include one or more bits (e.g., two bits) for boundary identification, one or more header bits and/or one or more bits (e.g., 64 bits) containing scrambled information.

The plurality of second encoded signals can comprise a different data rate and/or a different number of network lanes (e.g., virtual lanes, encoded lanes, etc.) than the plurality of first encoded signals. In one non-limiting example, the multiplexing component 102 can receive ten input system lanes (e.g., physical lanes). Each of the ten input system lanes can be transmitted at 10 Gb/s. Additionally, each of the ten input system lanes can include two virtual lanes. Each of the virtual lanes can be transmitted at 5 Gb/s. The multiplexing component 102 can then generate four output system lanes. Each of the four output system lanes can be transmitted at 25 Gb/s. Additionally, each of the four output system lanes can include five virtual lanes. As such, the multiplexing component 102 can convert x input lanes, where x is an integer value greater than or equal to one, into m output lanes, where m is an integer greater than or equal to one.

The monitoring component 104 can be configured to receive one or more virtual lanes (e.g., VIRTUAL LANE(S) shown in FIG. 1) from one or more physical lanes. For example, the monitoring component 104 can be configured to receive one or more virtual lanes received by the multiplexing component 102 and/or generated by the multiplexing component 102 (e.g., the monitoring component 104 can be configured to receive one or more virtual lanes before and/or after being processed by the multiplexing component 102). The monitoring component 104 can be configured to identify each of the one or more virtual lanes (e.g., identify an interleaving order for the one or more virtual lanes). Furthermore, the monitoring component 104 can be implemented to non-intrusively determine functionality (e.g., a retiming and/or multiplexing process) of the multiplexing component 102. For example, the monitoring component 104 can monitor one or more virtual lanes received and/or generated by the multiplexing component 102 (e.g., without altering and/or de-skewing the one or more virtual lanes). Furthermore, the monitoring component 104 can generate monitoring data (e.g., MONITORING DATA shown in FIG. 1) for the one or more virtual lanes. As such, the monitoring component 104 can facilitate troubleshooting and/or debugging of the system 100.

The monitoring component 104 can be configured to identify a block location for repeating blocks in each of the plurality of first encoded signals and/or each of the plurality of second encoded signals. For example, the monitoring component 104 can determine a start of block location of repeating blocks in each of the plurality of first encoded signals and/or each of the plurality of second encoded signals. In one embodiment, the block location can be determined based on a repeated bit (e.g., two bit) pattern. For example, a repeated bit pattern can be determined for 66B encoded signals (e.g., when implementing an Ethernet protocol). In one example, the start of block boundary can be determined by finding a location where a repeated 10 or 01 bit pattern is detected (e.g., a pattern repeated every 66 bits).

In another embodiment, the block location can be determined based on a frame alignment signal (FAS) pattern. For example, a FAS pattern can be identified when implementing an OTN protocol. The FAS pattern can be a repeated pattern. However, it is to be appreciated that a different type of bit pattern (e.g., a different number of bits) and/or a different technique can be implemented to identify a block location (e.g., a start of block boundary).

Furthermore, the monitoring component 104 can be configured to identify an alignment marker for repeating blocks in each of the plurality of first encoded signals and/or the plurality of second encoded signals. For example, the monitoring component 104 can identify a lane identification for each of the plurality of first encoded signals and/or each of the plurality of second encoded signals based on the alignment marker (e.g., the alignment marker can define a lane identification for a virtual lane). The lane identification can be associated with (e.g., identify) a virtual lane. Each of the plurality of first encoded signals and/or each of the plurality of second encoded signals can include a unique alignment marker. For example, the alignment maker (e.g., the lane identification) can be associated with a logical to physical mapping for each of the plurality of first encoded signals and/or each of the one or more second encoded signals. As such, an alignment marker can uniquely identify a virtual lane.

In one example, the alignment marker can be implemented to generate a framing pattern (e.g., a frame synchronization pattern) in each of the plurality of first encoded signals and/or each of the plurality of second encoded signals. In one embodiment, the alignment marker can be implemented as a block of data (e.g., a 66-bit block of data). For example, the block of data (e.g., the alignment marker) can include one or more bits for boundary identification (e.g., one or more repeating bits included in a sync header, etc.), one or more bits containing non-scrambled lane identification information, one or more bits for error monitoring (e.g., bit interleaved parity bits) and/or one or more inverted bits. As such, the monitoring component 104 can be implemented to identify each virtual lane in each physical lane.

Additionally or alternatively, the monitoring component 104 can determine error information associated with the plurality of first encoded signals and/or the plurality of second encoded signals. Additionally or alternatively, the monitoring component 104 can identify one or more defects (e.g., one or more block defects and/or one or more alignment marker defects) associated with the plurality of first encoded signals and/or the plurality of second encoded signals (e.g., one or more virtual lane defects). For example, the monitoring component 104 can determine one or more defective bits in each of the plurality of first encoded signals and/or each of the plurality of second encoded signals. In another example, the monitoring component 104 can determine a block lock loss and/or an alignment marker loss (e.g., a sync loss, detection of one or more invalid headers, etc.). The monitoring component 104 can determine a bit-interleaved parity (BIP) error value for each of the plurality of first encoded signals and/or each of the plurality of second encoded signals. Additionally or alternatively, the monitoring component 104 can maintain a BIP error count for each of the plurality of first encoded signals and/or each of the plurality of second encoded signals. In one example, the monitoring component 104 can determine a bit error rate (BER) quality value for each of the plurality of first encoded signals and/or each of the plurality of second encoded signals.

The monitoring component 104 can monitor each virtual lane in a physical lane (e.g., each virtual lane in a network). For example, the monitoring component 104 can implement a monitoring slice (e.g., a monitoring engine) for each virtual lane in a network. The monitoring component 104 can implement offline monitoring to monitor each virtual lane. For example, the monitoring component 104 can implement offline monitoring without terminating a signal and/or de-skewing a signal. Therefore, the monitoring component 104 can monitor a signal non-intrusively. In one embodiment, a monitoring slice (e.g., a monitoring engine) can monitor more than one virtual lane. As such, the monitoring component 104 can be configured to identify which virtual lane resides in which physical lane and/or to measure signal quality at a virtual lane level.

Figure 2:
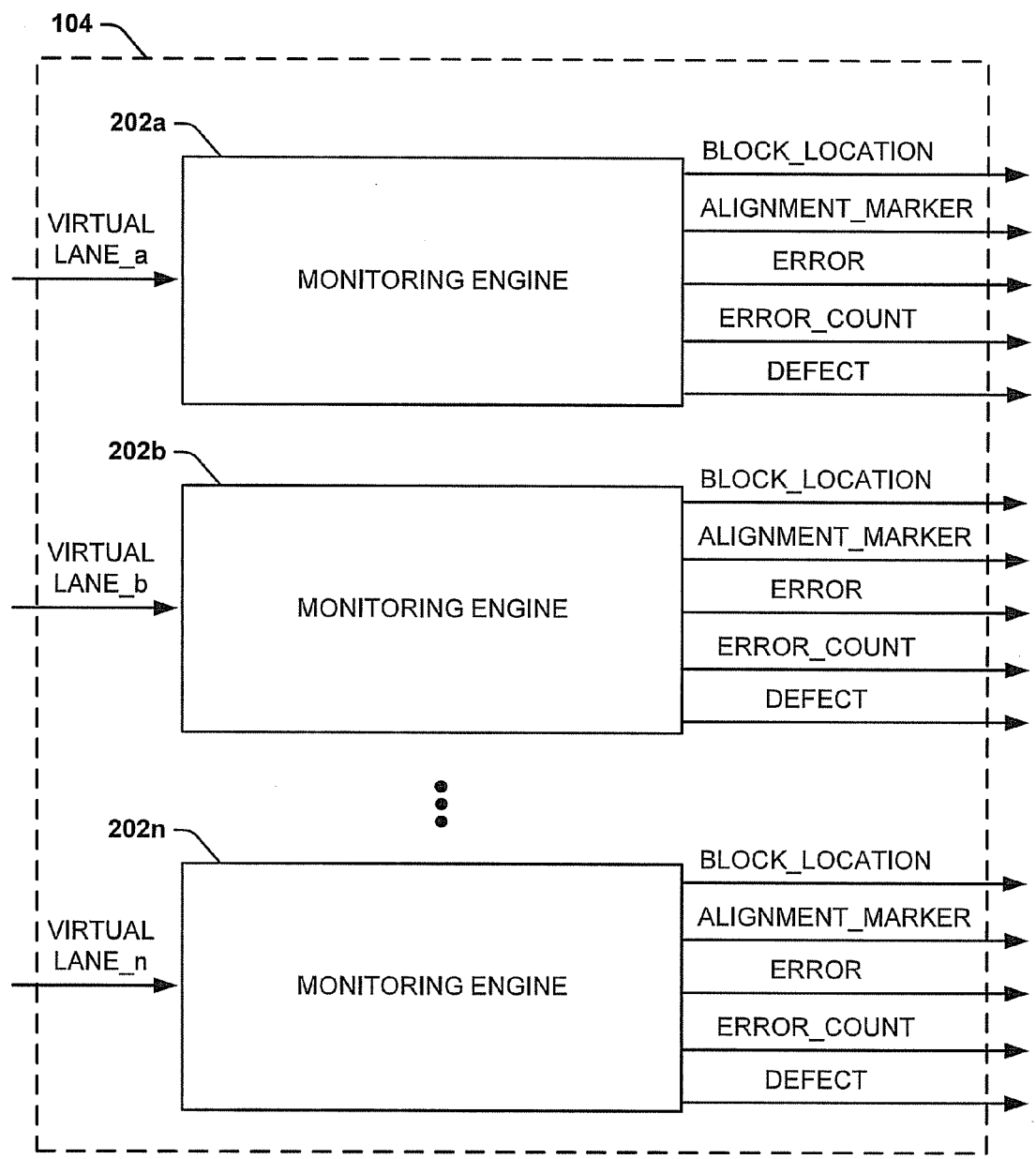
FIG. 2 is a block diagram illustrating an example, non-limiting embodiment of a monitoring component in accordance with various aspects described herein.

Referring now to FIG. 2, a block diagram illustrating an example, non-limiting embodiment of a monitoring component in accordance with various aspects described herein is shown. The monitoring component 104 includes one or more monitoring engines (monitoring slices) 202*a-n*.

Each of the monitoring engines 202*a-n* can receive a virtual lane (e.g., monitoring engine 202*a* can receive VIRTUAL LANE_a, monitoring engine 202*b* can receive VIRTUAL LANE_b, etc.). However, it is to be appreciated that a monitoring engine can monitor more than one virtual lane. In one example, the one or more virtual lanes (e.g., VIRTUAL LANE_a-VIRTUAL LANE_n) can be received from a single physical lane. In another example, the one or more virtual lanes (e.g., VIRTUAL LANE_a-VIRTUAL LANE_n) can be received from more than one physical lane. The monitoring engines 202*a-n* can monitor virtual lanes before and/or after a multiplexing component (e.g., the multiplexing component 102). Additionally, each of the monitoring engines 202*a-n* can generate one or more monitoring signals.

The monitoring engines 202*a-n* can be implemented as performance monitoring engines. As such, each monitoring engine 202*a-n* can be configured to determine a block location, an alignment marker, error information and/or defect information for at least one virtual lane. For example, each monitoring engine 202*a-n* can generate a block location signal (e.g., BLOCK_LOCATION shown in FIG. 2), an alignment marker signal (e.g., ALIGNMENT_MARKER shown in FIG. 2), an error signal (e.g., ERROR shown in FIG. 2), an error count signal (e.g., ERROR_COUNT shown in FIG. 2) and/or a defect signal (e.g., DEFECT shown in FIG. 2).

As such, the monitoring engines 202*a-n* can generate monitoring data (e.g., reporting data) for the virtual lanes (e.g., the monitoring engines 202*a-n* can monitor virtual lane(s) included in one or more physical lanes). Therefore, a block location, an alignment marker, error information and/or defect information for each virtual lane in a network can be used as a troubleshooting tool and/or a debugging tool (e.g., to isolate the network). Additionally or alternatively, a block location, an alignment marker, error information and/or defect information for each virtual lane in a network can be used for non-intrusive monitoring of line traffic (e.g., network traffic) in the network (e.g., an otherwise well-performing network).

Figure 3:
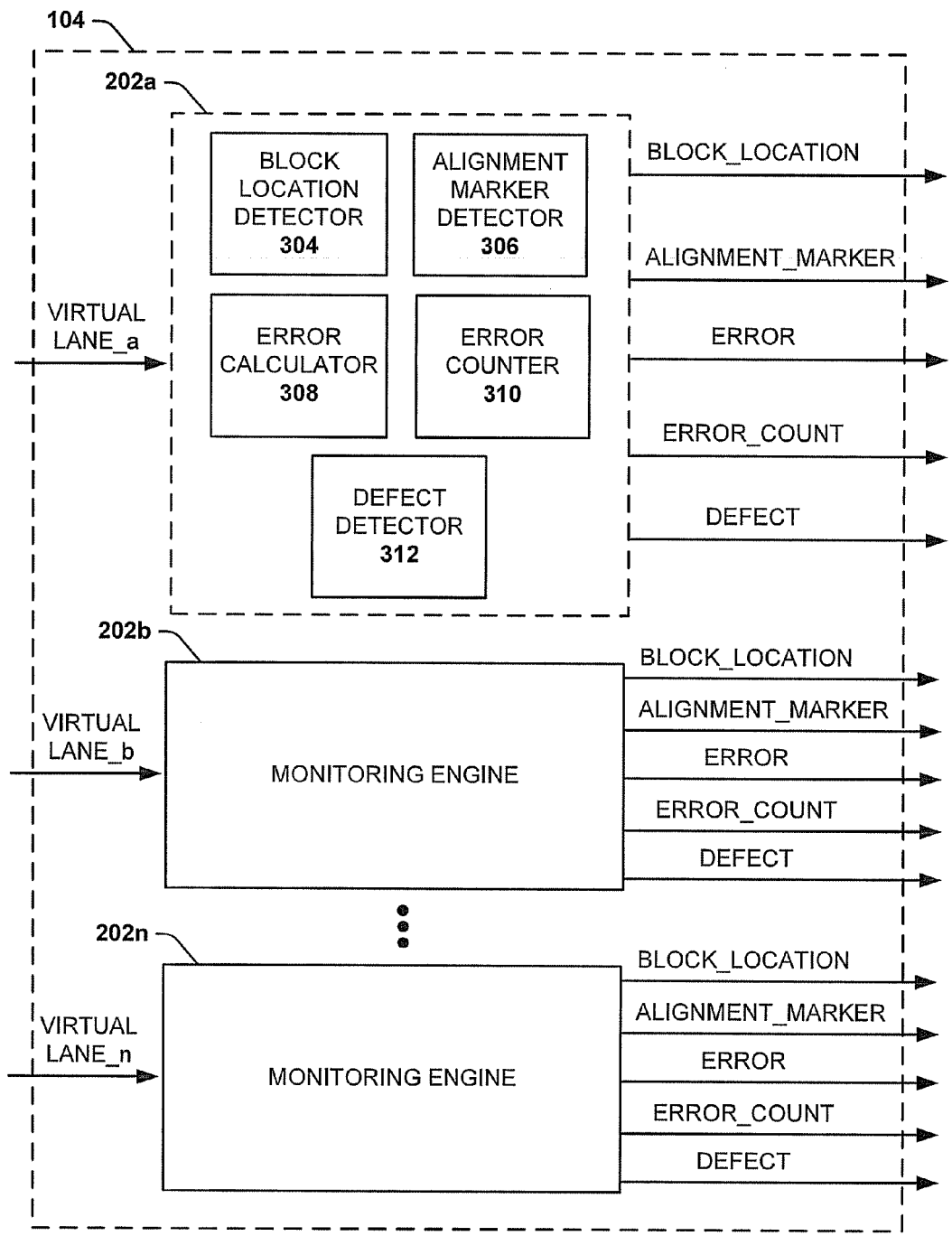
FIG. 3 is a block diagram illustrating an example, non-limiting embodiment of a monitoring engine in accordance with various aspects described herein.

Referring now to FIG. 3, a block diagram illustrating an example, non-limiting embodiment of a monitoring engine in accordance with various aspects described herein is shown. The monitoring component 104 includes the one or more monitoring engines (monitoring slices) 202*a-n*. Each of the monitoring engines 202*a-n* can include a block location detector 304, an alignment marker detector 306, an error calculator 308, an error counter 310 and/or a defect detector 312.

The block location detector 304 can generate and/or determine block location information. The block location information can be determined based on a framing bit and/or a syncword located in an encoded signal (e.g., located in a virtual lane). The block location detector 304 can determine a start of block location of repeating blocks (e.g., a block location within an encoded signal). For example, the block location detector can determine a location of a repeating pattern in a virtual lane bitstream. In one example, the repeating pattern can be a repeating bit pattern (e.g., a repeated two bit pattern, etc.). For example, the repeating pattern can be a repeated 10 or 01 bit pattern. In one non-limiting example, the repeating pattern can be repeated every 66 bits. In another example, repeating pattern can be a FAS pattern.

The alignment marker detector 306 can determine a lane status for each encoded signal (e.g., virtual lane). The alignment marker detector 306 can generate and/or determine alignment marker information. The alignment marker detector 306 can identify a lane identification for a corresponding virtual lane based on an alignment marker of the corresponding virtual lane. For example, the alignment marker detector 306 can report a lane identification number of a virtual lane within each physical lane. As such, the alignment marker detector 306 can determine an interleaving order for each physical lane.

The error calculator 308 can determine an error status for each encoded signal (e.g., virtual lane). The error calculator 308 can generate and/or determine error information. For example, the error calculator 308 can calculate error information for a virtual lane based on data stored in an alignment marker associated with the virtual lane. The error information can be associated with, for example, bit noise, bit interference, bit synchronization error, etc. In one example, the alignment marker can include error information (e.g., the alignment marker can include an error field). For example, the alignment marker can include bit interleaved parity 8 (BIP-8) data. In one example, error information can be stored in a next alignment marker block (e.g., an alignment marker block can include error information for a previous string of encoded data). Furthermore, the error calculator 308 can associate a BER quality value with each encoded signal (e.g., virtual lane). For example, the error calculator 308 can determine a BER quality value for each encoded signal (e.g. virtual lane) identified by the alignment marker detector 306.

The error counter 310 can generate and/or maintain an error counter. For example, the error counter 310 can retain a parity error count (e.g., a BIP error count value) for each virtual lane. The parity error count can be a measure of BER quality of a link for each virtual lane. For example, the error calculator 308 and/or the error counter 310 can generate a BER quality value. The BER quality value can be determined by dividing the number of bit errors (e.g., determined by the error counter 310) by the total number of transferred bits over a certain time interval.

The defect detector 312 can determine one or more defects (e.g., one or more block defects and/or one or more alignment marker defects) associated with an encoded signal(s). For example, the defect detector 312 can identify one or more defects for each virtual lane (e.g., identify one or more virtual lane defects). In one example, the defect detector 312 can determine one or more defective bits in an encoded signal(s). In another example, the defect detector 312 can determine a block lock loss and/or an alignment marker loss (e.g., a sync loss, detection of one or more invalid headers, etc.). In yet another example, the defect detector 312 can determine one or more defects associated with a block and/or an alignment marker of an encoded signal. As such, the defect detector 312 can generate defect information for each encoded signal (e.g., each virtual lane) in a network.

Figure 4:
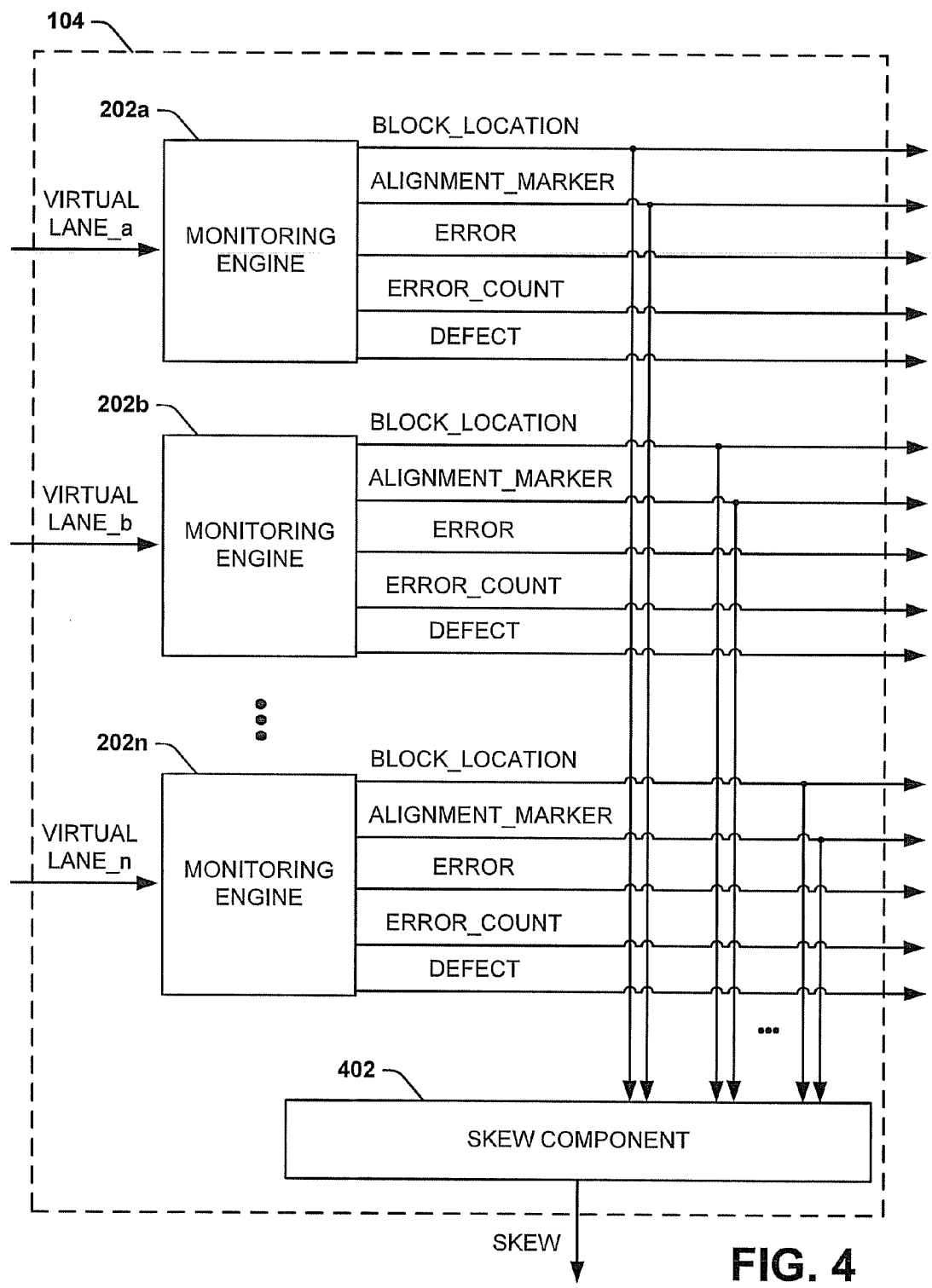
FIG. 4 is a block diagram illustrating another example, non-limiting embodiment of a monitoring component in accordance with various aspects described herein.

Referring now to FIG. 4, a block diagram illustrating an example, non-limiting embodiment of a skew component in accordance with various aspects described herein is shown. The monitoring component 104 includes the one or more monitoring engines (monitoring slices) 202a-n and a skew component 402. Each of the monitoring engines 202a-n can include the block location detector 304, the alignment marker detector 306, the error calculator 308, the error counter 310 and/or the defect detector 312.

The skew component 402 can measure skew and/or generate one or more skew related signals (e.g., SKEW shown in FIG. 4) based at least in part on information received from each of the monitoring engines 202a-n (e.g., block location information, alignment marker information, etc.). The skew component 402 can measure relative delay (e.g., a delay value) between virtual lanes. For example, the skew component 402 can measure relative delay between virtual lanes based at least in part on alignment marker positions determined by the alignment marker detector 306. For example, the skew component 402 can count the number of clocks between alignment marker positions (e.g., alignment marker positions in a virtual lane). However, it is to be appreciated that other techniques can be implemented to measure skew. The skew can be measured in unit intervals (UI), bits, time (e.g., nanoseconds), etc. The skew component 402 can report the skew to a host device (e.g., via a host interface).

In one embodiment, the skew component 402 can determine whether physical routes between virtual lanes differ. For example, the skew component 402 can determine whether a difference (e.g., a relative delay) between virtual lanes is greater than a threshold value. In one embodiment, the skew component 402 can determine network route(s) with large skew (e.g., a network route with one or more skew values above a threshold value).

Figure 5:
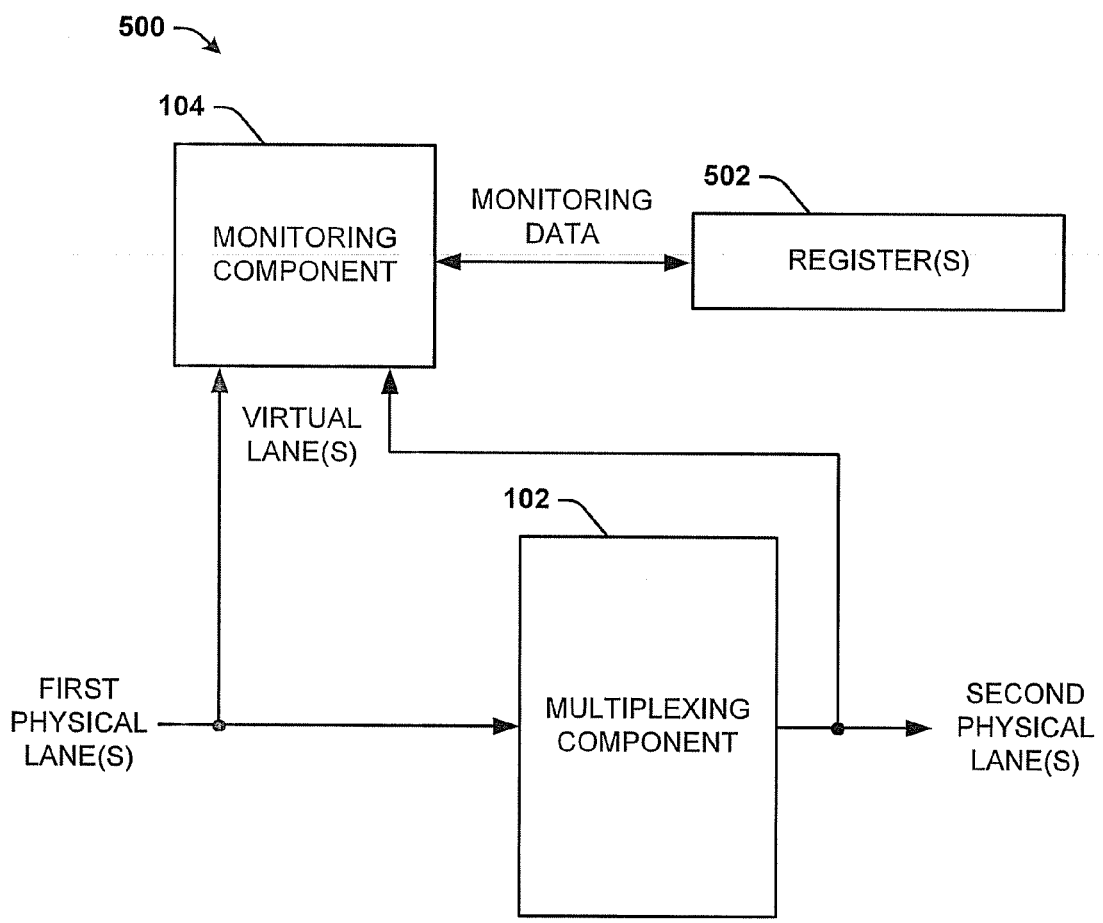
FIG. 5 is a block diagram illustrating another example, non-limiting embodiment of a network monitoring system in accordance with various aspects described herein.

Referring now to FIG. 5, a block diagram illustrating an example, non-limiting embodiment of a monitoring system in accordance with various aspects described herein is shown. The system 500 includes the multiplexing component 102, the monitoring component 104 and one or more registers 502.

The one or more registers 502 can store monitoring data. For example, the one or more registers 502 can store the alignment marker, the defect information (e.g., block defect information and/or alignment marker defect information), the error information (e.g., BIP error value, BIP error count, etc.) and/or skew data for each virtual lane. Monitoring data for each virtual lane can be stored in the one or more registers 502. In one embodiment, alignment marker information can be stored in one or more registers, the defect information (e.g., block defect information and/or alignment marker defect information) can be stored in one or more registers, error information (e.g., error value information and/or error counters) can be stored in one or more registers and/or skew information can be stored in one or more registers.

In one example, at least one of the one or more registers 502 can be implemented as a flip-flop register. In another example, at least one of the one or more registers 502 can be implemented as a status register. In yet example, at least one of the one or more registers 502 can be implemented as a counter register. In one embodiment, the one or more registers 502 can be coupled to a host interface. As such, monitoring data can be stored in the one or more registers 502 for analysis (e.g., the one or more registers 502 can provide troubleshooting and/or debugging data).

Figure 6:
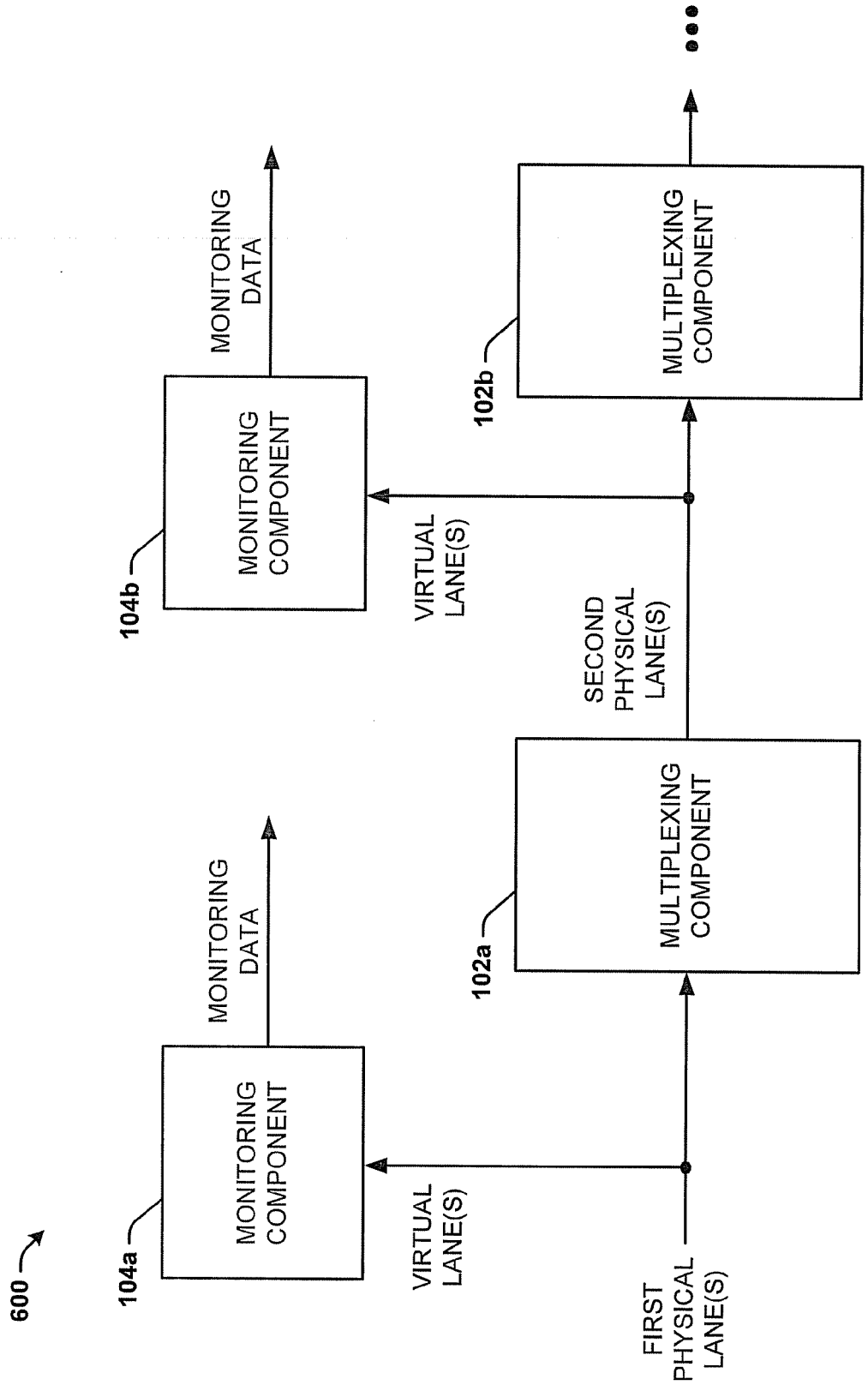
FIG. 6 is a block diagram illustrating yet another example, non-limiting embodiment of a network monitoring system in accordance with various aspects described herein.

Referring now to FIG. 6, a block diagram illustrating an example, non-limiting embodiment of a monitoring system in accordance with various aspects described herein is shown. The system 600 includes a multiplexing component 102a, a multiplexing component 102b, a monitoring component 104a and a monitoring component 104b. However, it is to be appreciated that the system 600 can include a different number of multiplexing components and/or a different number of monitoring components.

The monitoring component 104a can non-intrusively monitor one or more encoded signals associated with the multiplexing component 102a and the monitoring component 104b can non-intrusively monitor one or more encoded signals associated with the multiplexing component 102b. For example, the monitoring component 104a can monitor one or more virtual lanes received by the multiplexing component 102a and the monitoring component 104b can monitor one or more virtual lanes received by the multiplexing component 102b. As such, each virtual lane (e.g., encoded signal) in a network can be monitored and/or tracked during normal operation of the network (e.g., without interrupting functionality of the network).

Figure 7:
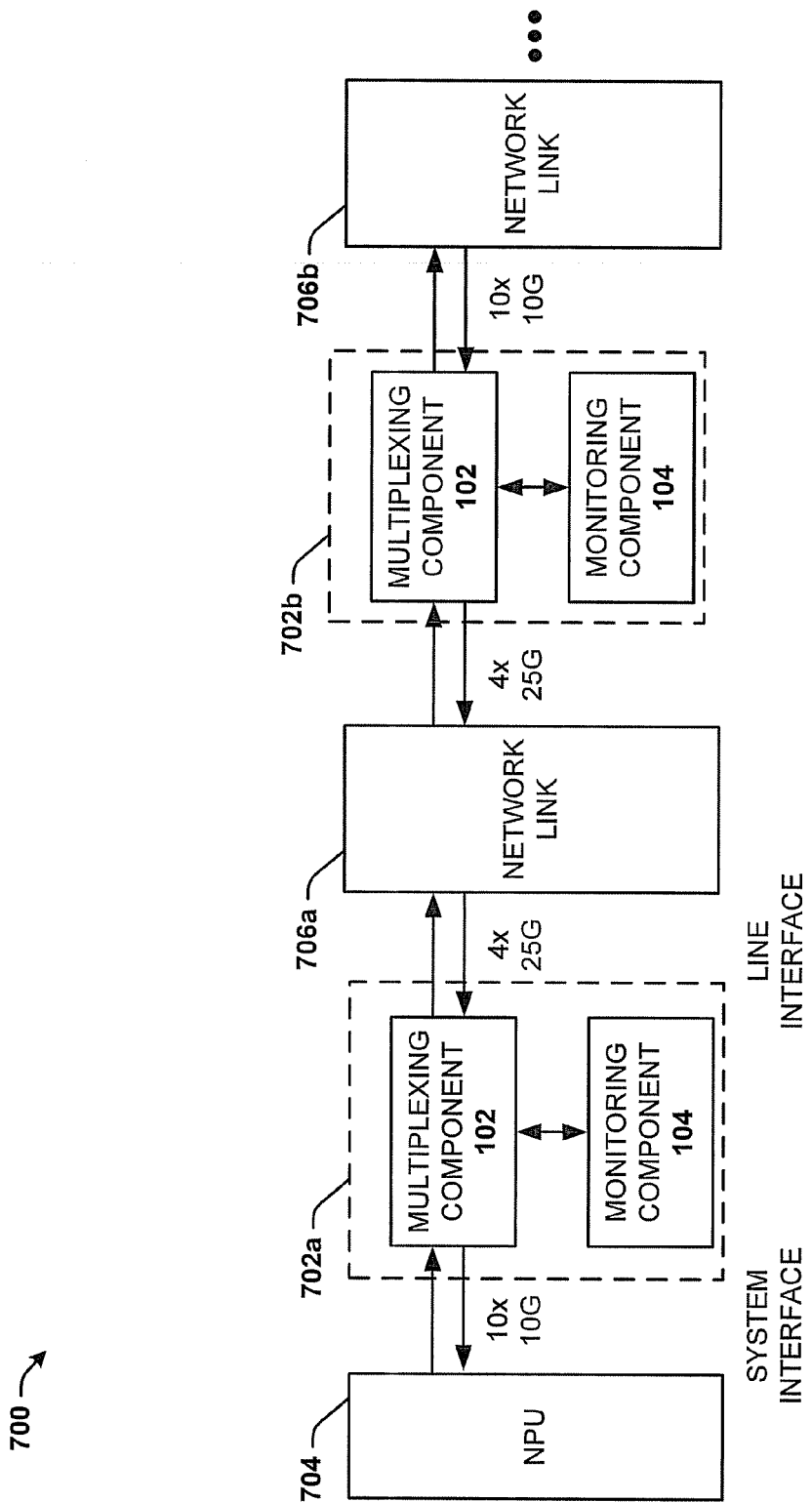
FIG. 7 is a block diagram illustrating an example, non-limiting embodiment of devices within a network system in accordance with various aspects described herein.

Referring now to FIG. 7, a block diagram illustrating an example, non-limiting embodiment of devices in a network system in accordance with various aspects described herein is shown. The system 700 includes an interface component 702a, an interface component 702b, a network processing unit (NPU) 704, a network link 706a, and a network link 706b. However, it is to be appreciated that the system 700 can include a different number of interface components, NPUs and/or network links. The interface component 702a and the interface component 702b can include the multiplexing component 102 (or multiplexing components 102a-n) and the monitoring component 104 (or monitoring components 104a-n).

In the non-limiting example shown in FIG. 7, the NPU 704 can generate and/or receive (e.g., via a system interface) ten physical lanes with a data rate of 10 Gbps (e.g., 10×10G). The network link 706a can transmit and/or receive (e.g., via a line interface) four physical lanes with a data rate of 25 Gbps (e.g., 4×25G). The network link 706b can transmit and/or receive ten physical lanes with a data rate of 10 Gbps (e.g., 10×10G). The interface component 702a can be implemented on a different network than the interface component 702b. As such, the monitoring component 104 of the interface component 702a and the interface component 702b can be implemented to non-intrusively monitor one or more virtual lanes included in each of the physical lanes of the system 700, as more fully disclosed herein.

Figure 8:
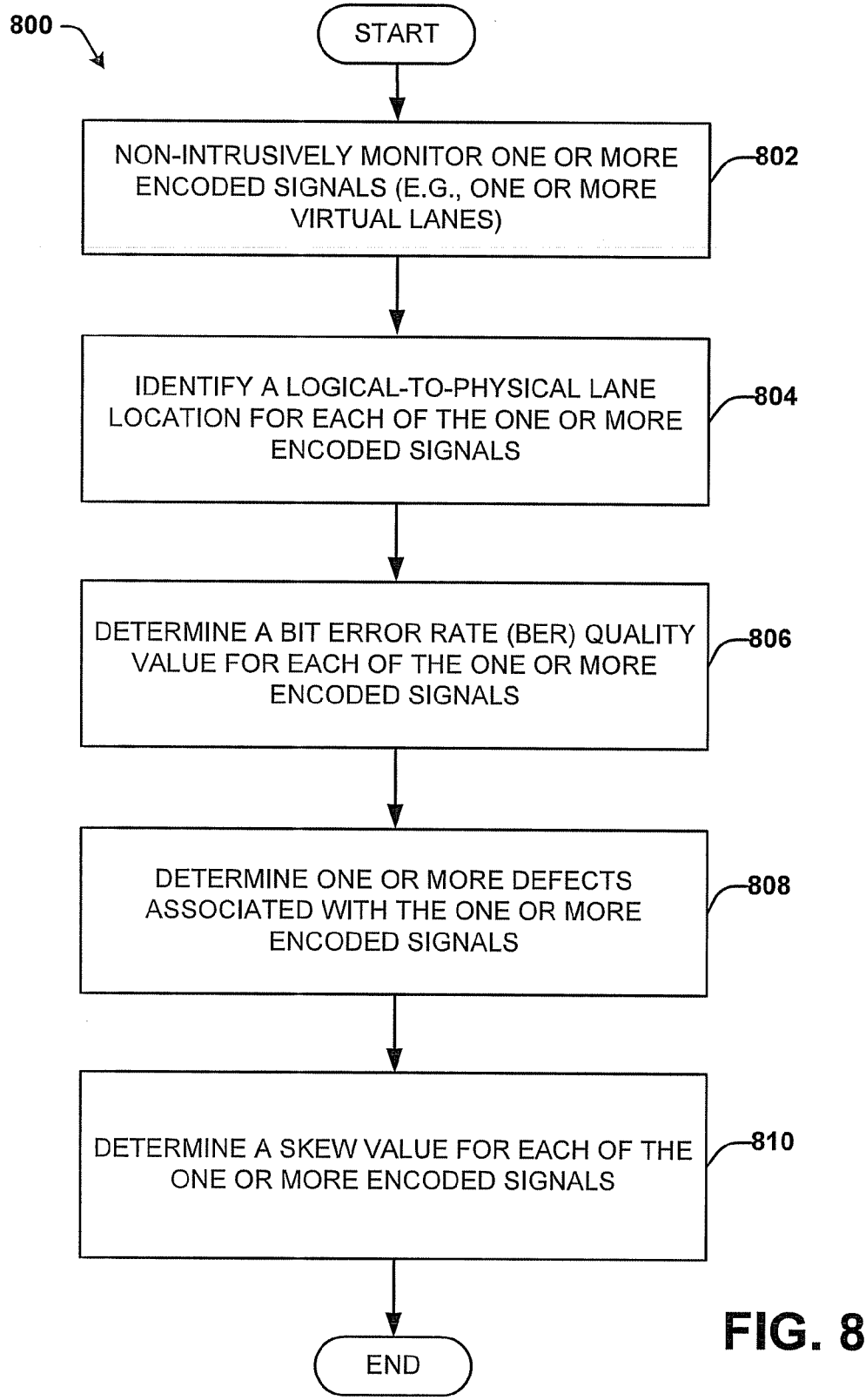
FIG. 8 illustrates a flow diagram of an example, non-limiting embodiment of a method for monitoring a network.
Figure 9:
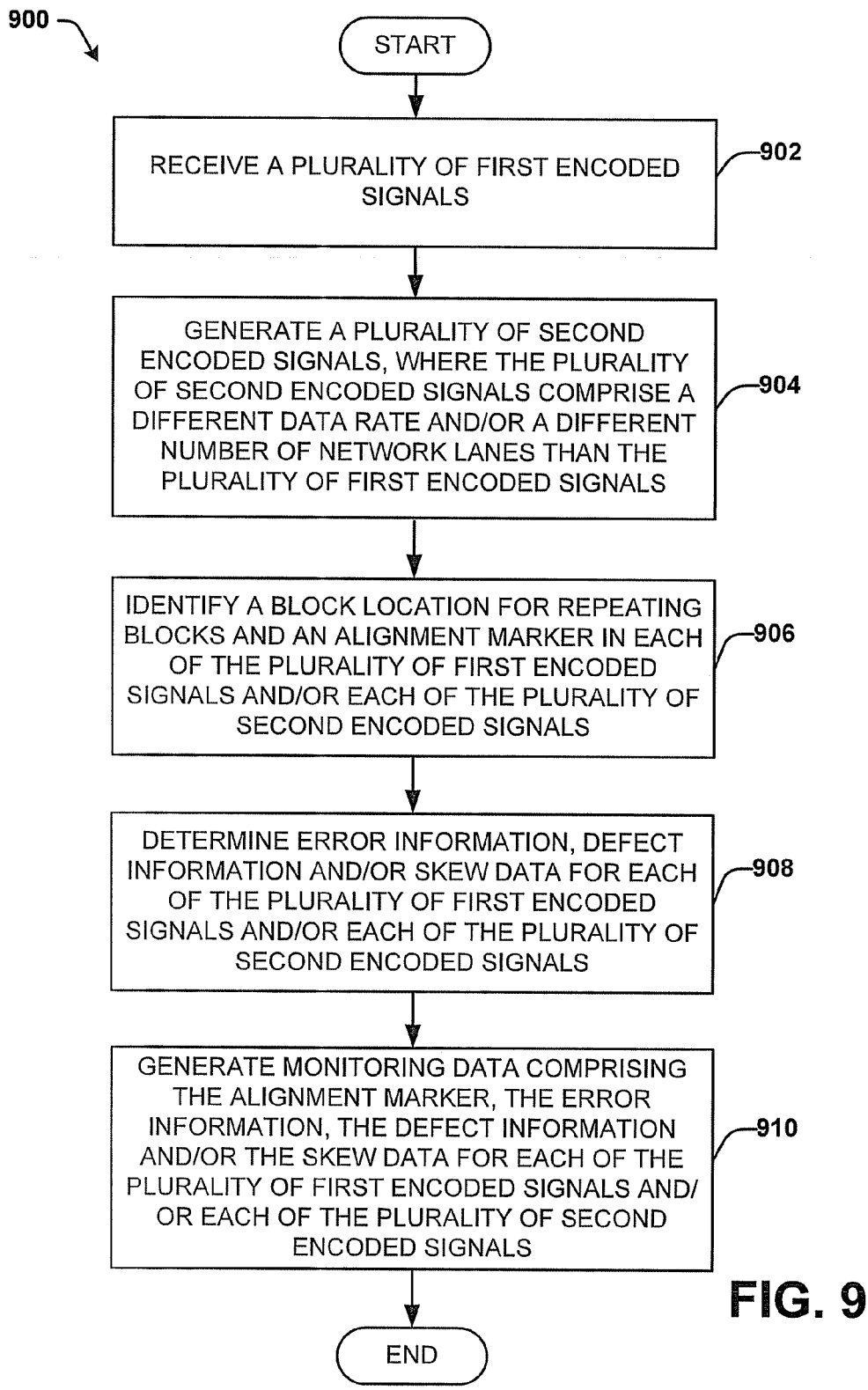
FIG. 9 illustrates a flow diagram of another example, non-limiting embodiment of a method for monitoring a network.
Figure 10:
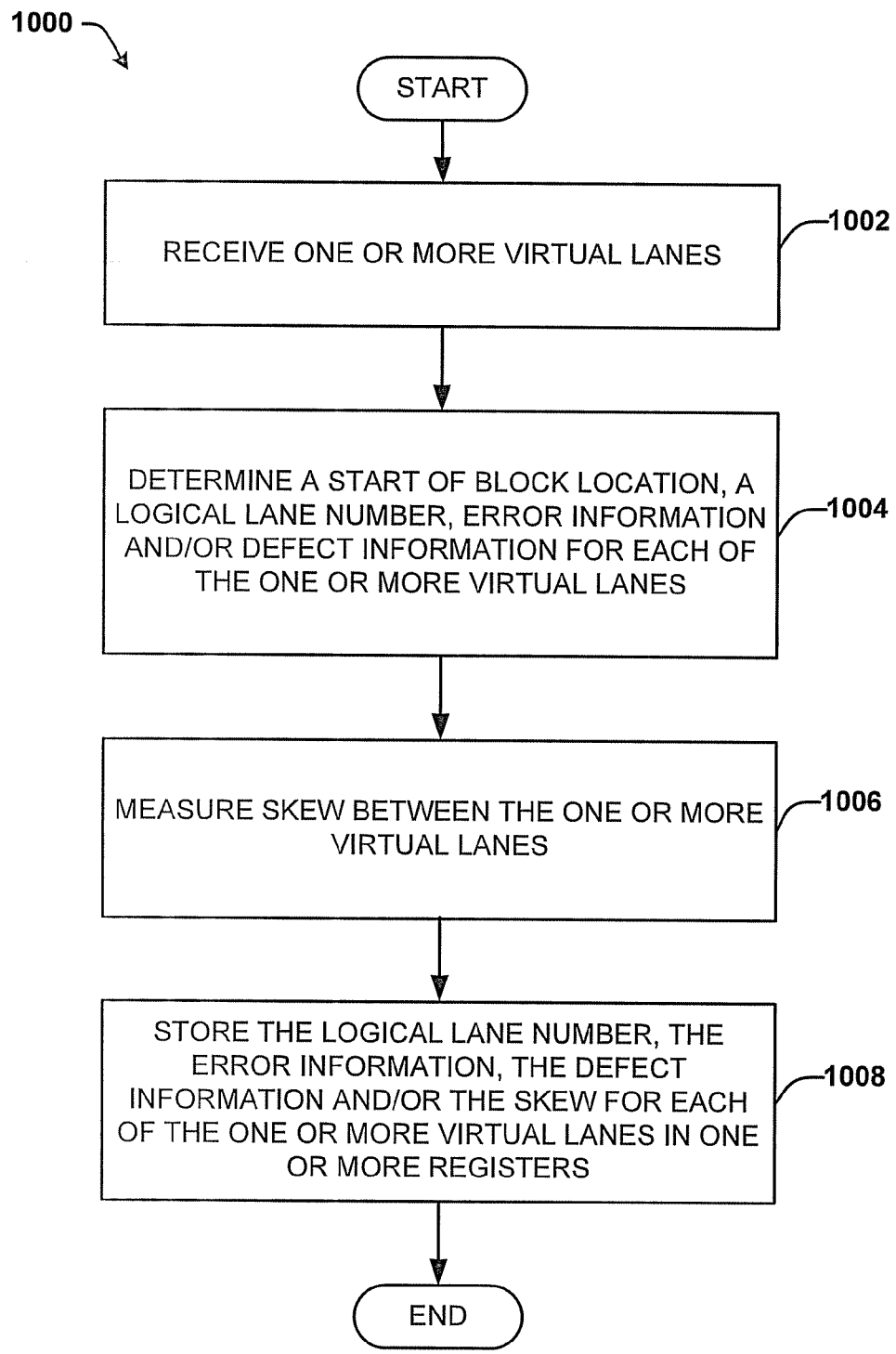
FIG. 10 illustrates a flow diagram of yet another example, non-limiting embodiment of a method for monitoring a network.

In view of the example systems described above, methods that may be implemented in accordance with the described subject matter may be better appreciated with reference to the flow charts of FIGS. 8-10. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Referring now to FIG. 8, a flow diagram of an example, non-limiting embodiment of a method for monitoring a network system is shown. Method 800 can begin at block 802, where one or more encoded signals (e.g., one or more virtual lanes) are non-intrusively monitored (e.g., using a monitoring component 104). For example, a block location, an alignment marker, error information, defect information and/or skew information can be determined for each of the one or more encoded signals (e.g., without altering and/or de-skewing the one or more encoded signals).

At block 804, a logical-to-physical lane location is identified (e.g., using a monitoring component 104) for each of the one or more encoded signals. For example, virtual to physical lane mapping of the one or more encoded signals included in one or more physical lanes can be determined. As such, an interleaving order of the one or more encoded signals can be determined.

At block 806, a bit error rate (BER) quality value is determined (e.g., using a monitoring component 104) for each of the one or more encoded signals. For example, a BER quality value can be determined based at least in part on a BIP-8 parity value stored in the alignment marker of each of the one or more encoded signals.

At block 808, one or more defects associated with the one or more encoded signals are determined (e.g., using a monitoring component 104). For example, a block lock loss and/or an alignment marker loss (e.g., a sync loss, detection of one or more invalid headers, etc.) for each of the encoded signals can be determined. In one example, the one or more defects can be associated with a block and/or an alignment marker of an encoded signal.

At block 810, a skew value is determined (e.g., using a monitoring component 104) for each of the one or more encoded signals. For example, skew between each of the one or more encoded signals can be measured.

Referring now to FIG. 9, a flow diagram of another example, non-limiting embodiment of a method for monitoring a network system is shown. Method 900 can begin at block 902, where a plurality of first encoded signals are received (e.g., by a multiplexing component 102). For example, a plurality of encoded signals (e.g., a plurality of logical streams, a plurality of virtual lanes, etc.) can be received from one or more physical lanes.

At block 904, a plurality of second encoded signals are generated (e.g., by a multiplexing component 102). The plurality of second encoded signals comprise a different data rate and/or a different number of network lanes than the plurality of first encoded signals. For example, the plurality of encoded signals can be multiplexed or de-multiplexed to generate a plurality of different encoded signals.

At block 906, a block location for repeating blocks and an alignment marker are identified (e.g., by a monitoring component 104) in each of the plurality of first encoded signals and/or each of the plurality of second encoded signals. For example, the repeating blocks can be identified based on a repeating bit pattern in each of the plurality of first encoded signals and/or the plurality of second encoded signals.

At block 908, error information, defect information and/or skew data can be determined (e.g., by a monitoring component 104) for each of the plurality of first encoded signals and/or each of the plurality of second encoded signals. For example, a BER quality value, block defect(s), alignment marker defect(s) and/or delay value(s) can be determined for each of the plurality of first encoded signals and/or each of the plurality of second encoded signals.

At block 910, monitoring data comprising the alignment marker, the error information, the defect information and/or the skew data is generated (e.g., by a monitoring component 104) for each of the plurality of first encoded signals and/or the plurality of second encoded signal. For example, a monitoring signal comprising the alignment marker, the error information, the defect information and/or the skew data can be generated for each of the plurality of first encoded signals and/or each of the plurality of second encoded signal. In one example, the alignment marker, the error information, the defect information and/or the skew data generated for each of the plurality of first encoded signals and/or the plurality of second encoded signal can be stored in one or more registers (e.g., the one or more registers 502).

Referring now to FIG. 10, a flow diagram of yet another example, non-limiting embodiment of a method for monitoring a network system is shown. Method 1000 can begin at block 1002, where one or more virtual lanes are received (e.g., using a monitoring component 104). For example, one or more virtual lanes can be received from one or more physical lanes.

At block 1004, a start of block location, a logical lane number, error information and/or defect information are determined (e.g., using a monitoring component 104) for each of the one or more virtual lanes. For example, each of the one or more virtual lanes can be monitored to determine a start of block location, a logical lane number, error information and/or defect information for each of the one or more virtual lanes (e.g., without altering and/or de-skewing each of the one or more virtual lanes).

At block 1006, skew between the one or more virtual lanes is measured (e.g., using a monitoring component 104). For example, relative delay between each of the one or more virtual lanes can be determined.

At block 1008, the logical lane number, the error information, the defect information and/or the skew for each of the one or more virtual lanes are stored in one or more registers (e.g., register(s) 502). For example, the one or more registers can include one or more flip-flop registers, one or more status registers and/or one or more counter registers.

Example Computing Environment

Figure 11:
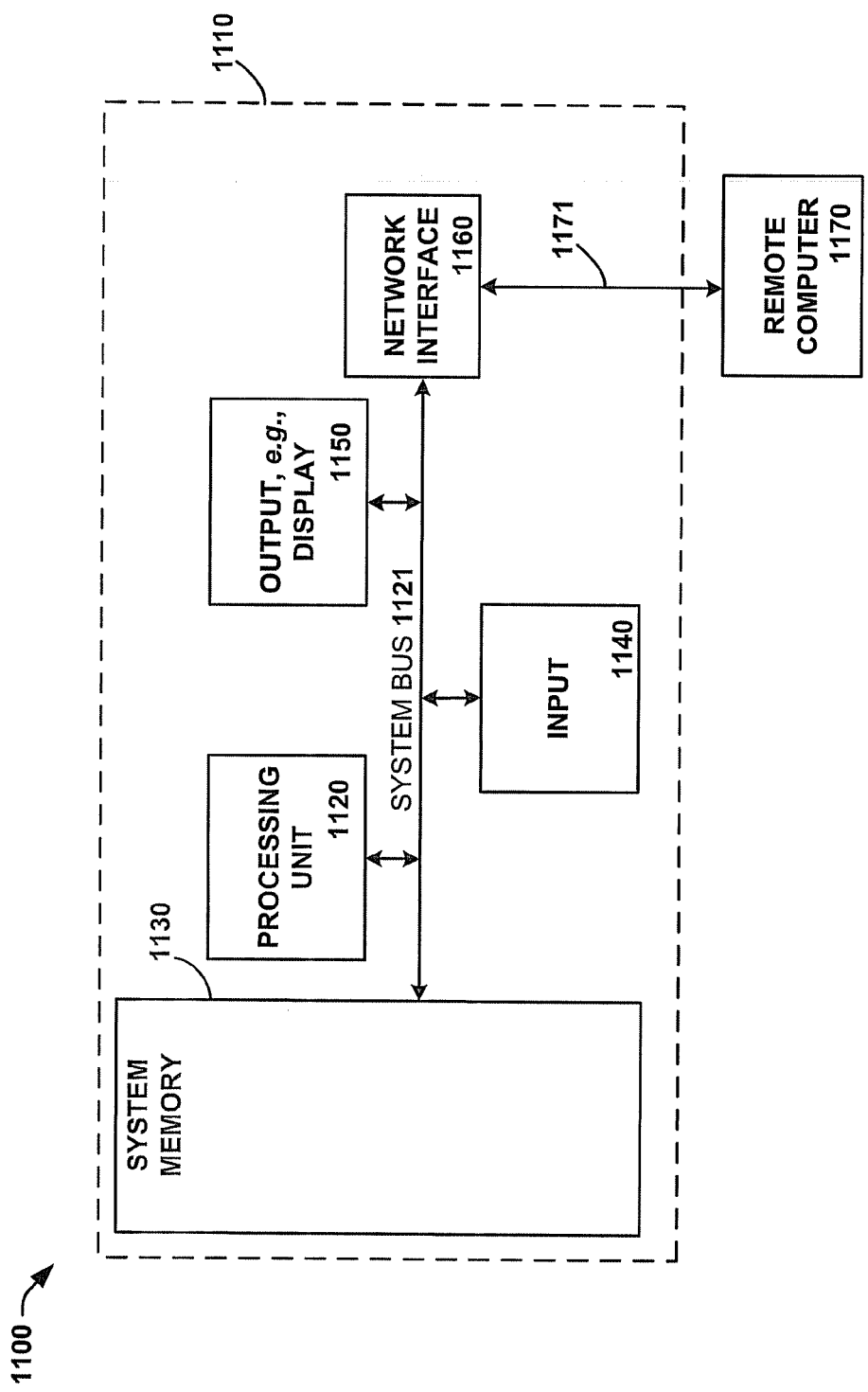
FIG. 11 illustrates a block diagram of an example electronic computing environment that can be implemented in conjunction with one or more aspects described herein.

As mentioned, advantageously, the techniques described herein can be applied to any device and/or network where it is desirable to monitor encoded signals. It is to be understood, therefore, that handheld, portable and other computing devices and computing objects of all kinds are contemplated for use in connection with the various non-limiting embodiments, i.e., anywhere that a device may wish to monitor encoded signals. Accordingly, the below general purpose remote computer described below in FIG. 11 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 11 thus illustrates an example of a suitable computing system environment 1100 in which some aspects of the disclosed subject matter can be implemented, although as made clear above, the computing system environment 1100 is only one example of a suitable computing environment for a device and is not intended to suggest any limitation as to the scope of use or functionality of the disclosed subject matter. Neither should the computing environment 1100 be interpreted as having any dependency or requirement relating to any one or combination of components illustrated in the exemplary operating environment 1100.

With reference to FIG. 11, an exemplary device for implementing the disclosed subject matter includes a general-purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures.

Computer 1110 typically includes a variety of computer readable media. Computer readable media can be any available media that can be accessed by computer 1110. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules, or other data in a modulated data signal such as a carrier wave or other transport mechanism and includes any information delivery media.

The system memory 1130 may include computer storage media in the form of volatile and/or nonvolatile memory such as read only memory (ROM) and/or random access memory (RAM). A basic input/output system (BIOS), containing the basic routines that help to transfer information between elements within computer 1110, such as during start-up, may be stored in memory 1130. Memory 1130 typically also contains data and/or program modules that are immediately accessible to and/or presently being operated on by processing unit 1120. By way of example, and not limitation, memory 1130 may also include an operating system, application programs, other program modules, and program data.

The computer 1110 may also include other removable/non-removable, volatile/nonvolatile computer storage media. For example, computer 1110 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1121 through a non-removable memory interface such as an interface, and a magnetic disk drive or optical disk drive is typically connected to the system bus 1121 by a removable memory interface, such as an interface.

A user can enter commands and information into the computer 1110 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1120 through user input 1140 and associated interface(s) that are coupled to the system bus 1121, but may be connected by other interface and bus structures, such as a parallel port, game port, or a universal serial bus (USB). A graphics subsystem can also be connected to the system bus 1121. A projection unit in a projection display device, or a HUD in a viewing device or other type of display device can also be connected to the system bus 1121 via an interface, such as output interface 1150, which may in turn communicate with video memory. In addition to a monitor, computers can also include other peripheral output devices such as speakers which can be connected through output interface 1150.

The computer 1110 can operate in a networked or distributed environment using logical connections to one or more other remote computer(s), such as remote computer 1170, which can in turn have media capabilities different from device 1110. The remote computer 1170 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1110. The logical connections depicted in FIG. 11 include a network 1171, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1110 can be connected to the LAN 1171 through a network interface or adapter. When used in a WAN networking environment, the computer 1110 can typically include a communications component, such as a modem, or other means for establishing communications over the WAN, such as the Internet. A communications component, such as wireless communications component, a modem and so on, which can be internal or external, can be connected to the system bus 1121 via the user input interface of input 1140, or other appropriate mechanism. In a networked environment, program modules depicted relative to the computer 1110, or portions thereof, can be stored in a remote memory storage device. It will be appreciated that the network connections shown and described are exemplary and other means of establishing a communications link between the computers can be used.

Example Networking Environment

Figure 12:
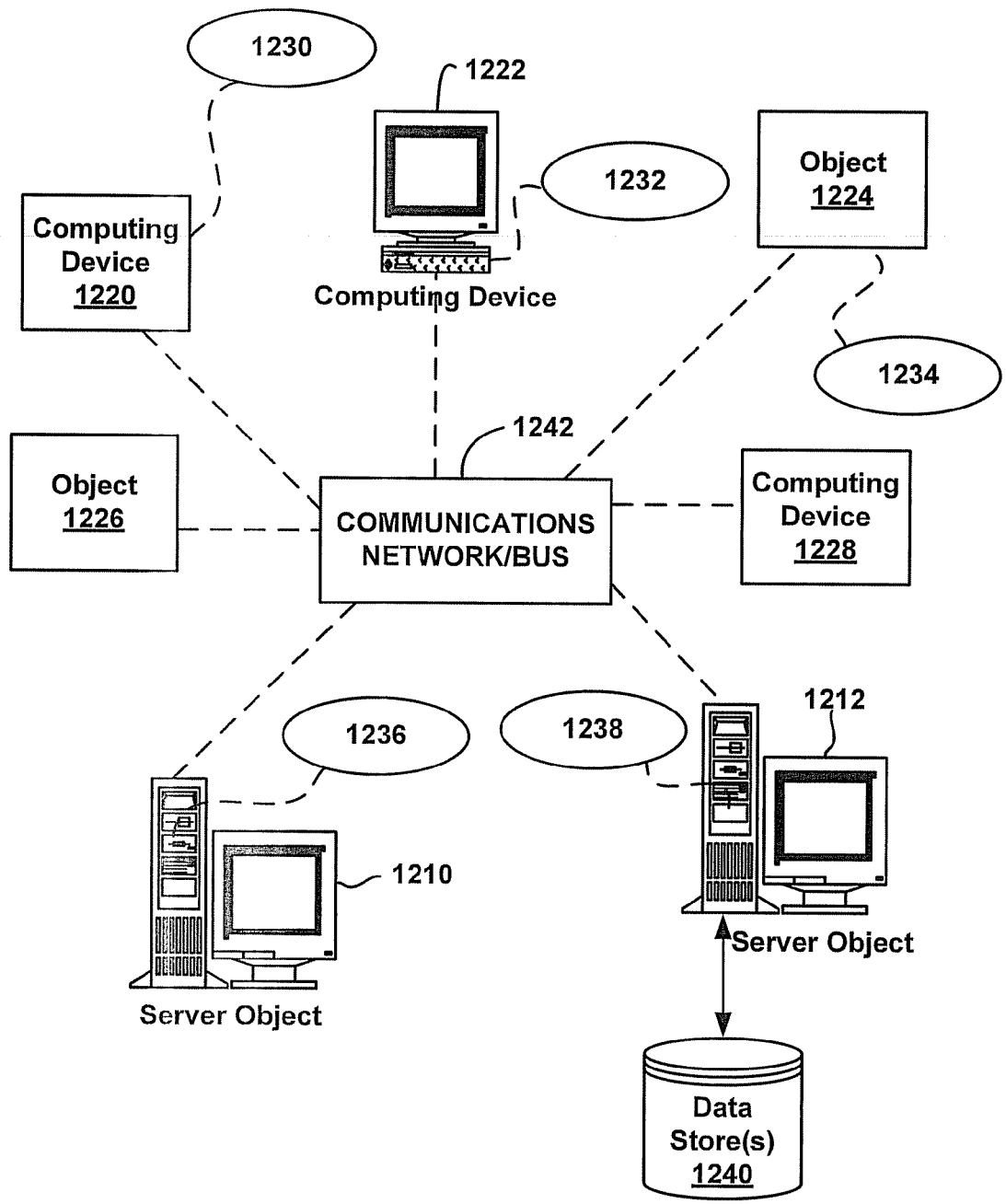
FIG. 12 illustrates a block diagram of an example data communication network that can be operable in conjunction with various aspects described herein.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238 and data store(s) 1240. It can be appreciated that computing objects 1210, 1212, etc. and computing objects or devices 1220, 1222, 1224, 1226, 1228, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1240 can include registers 502, or other similar data stores disclosed herein.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1242, either directly or indirectly. Even though illustrated as a single element in FIG. 12, communications network 1242 may comprise other computing objects and computing devices that provide services to the system of FIG. 12, and/or may represent multiple interconnected networks, which are not shown. Each computing object 1210, 1212, etc. or computing object or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

Reference throughout this specification to "one embodiment," "an embodiment," "an example", "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one example," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system, comprising:
   a multiplexing component configured for receiving a plurality of first encoded signals via an input physical lane coupled to the multiplexing component, and for generating a plurality of second encoded signals transmitted via an output physical lane coupled to the multiplexing component, wherein the plurality of second encoded signals associated with the output physical lane comprise a different data rate and a different number of encoded network lanes than the plurality of first encoded signals associated with the input physical lane; and
   a monitoring component configured for monitoring the plurality of first encoded signals transmitted via the input physical lane that is coupled to the multiplexing component, for monitoring the plurality of second encoded signals transmitted via the output physical lane that is coupled to the multiplexing component, for identifying a block location for repeating blocks and an alignment marker in each of the plurality of second encoded signals, for generating monitoring data for the plurality of second encoded signal based on the monitoring the plurality of second encoded signals, and storing the monitoring data in a register coupled to the multiplexing component, the monitoring data comprising the block location and the alignment marker, and the alignment marker being a block of data for a virtual lane in the plurality of second encoded signals that comprises an identification pattern for the virtual lane.

2. The system of claim 1, wherein the monitoring component is further configured for identifying one or more defects associated with the plurality of second encoded signals.

3. The system of claim 1, wherein the plurality of second encoded signals are implemented as a plurality of virtual lanes.

4. The system of claim 1, wherein the monitoring component is configured for identifying the virtual lane based on the alignment marker.

5. The system of claim 1, wherein the alignment marker is associated with a logical to physical mapping for mapping the virtual lane to a physical lane.

6. The system of claim 1, wherein the alignment marker comprises error information for the virtual lane.

7. The system of claim 1, wherein the alignment marker identified in each of the plurality of second encoded signals transmitted via the output physical lane comprises a frame synchronization pattern associated with at least boundary information and error monitoring information.

8. The system of claim 1, wherein the monitoring component is further configured for calculating a bit-interleaved parity (BIP) error value for each of the plurality of second encoded signals.

9. The system of claim 1, wherein the monitoring component is further configured for determining a bit error rate (BER) quality value for each of the plurality of second encoded signals.

10. The system of claim 1, wherein the monitoring component is further configured for determining one or more skew values associated with the plurality of second encoded signals.

11. The system of claim 1, wherein the plurality of second encoded signals are multi-lane distribution signals.

12. A method, comprising:
receiving, by a system comprising a processor, a plurality of first encoded signals;
generating, by the system, a plurality of second encoded signals, wherein the plurality of second encoded signals comprise a different data rate and a different number of network lanes than the plurality of first encoded signals;
monitoring, by the system, a first physical lane associated with the plurality of first encoded signals;
monitoring, by the system, a second physical lane associated with the plurality of second encoded signals;
identifying, by the system, a block location for repeating blocks and an alignment marker in each of the plurality of second encoded signals, the alignment marker being a block of data for a virtual lane in the plurality of second encoded signals that comprises an identity pattern for the virtual lane;
generating, by the system, monitoring data comprising at least the alignment marker for each of the plurality of second encoded signals; and
storing, by the system, the monitoring data comprising at least the alignment marker for each of the plurality of second encoded signals in one or more registers.

13. The method of claim 12, further comprising:
identifying, by the system, a virtual lane based on the alignment marker.

14. The method of claim 12, further comprising:
determining, by the system, a logical to physical mapping for the virtual lane based on the identity pattern.

15. The method of claim 12, wherein the identifying comprises identifying the block location based on a repeating pattern.

16. The method of claim 12, further comprising:
generating, by the system, a bit-interleaved parity (BIP) error count value based on the plurality of second encoded signals.

17. The method of claim 12, further comprising:
determining, by the system, a bit error rate (BER) quality value for each of the plurality of second encoded signals.

18. The method of claim 12, further comprising:
measuring, by the system, a delay value between each of the plurality of second encoded signals.

19. The method of claim 12, further comprising:
determining, by the system, one or more defects associated with the plurality of second encoded signals.

20. A device, comprising:
a multiplexing component configured for receiving one or more first encoded signals, and for generating one or more second encoded signals, wherein the one or more second encoded signals comprise a different data rate and a different number of network lanes than the one or more first encoded signals; and
a monitoring component configured for monitoring a first physical lane that is associated with the one or more first encoded signals and is coupled to the multiplexing component, for monitoring a second physical lane that is associated with the one or more second encoded signals and is coupled to the multiplexing component, for identifying a block location for repeating blocks and an alignment marker in each of the one or more second encoded signals, for generating monitoring data comprising at least the alignment marker, defect information and skew information for each of the one or more second encoded signals, and for storing the monitoring data comprising at least the alignment marker, the defect information and the skew information in one or more registers, the alignment marker being a block of data for a virtual lane in the plurality of second encoded signals that comprises an identification pattern and error information for the virtual lane.

* * * * *